United States Patent
Fukuoka et al.

(10) Patent No.: US 7,817,744 B2
(45) Date of Patent: Oct. 19, 2010

(54) WIRELESS COMMUNICATION APPARATUS AND DATA MULTIPLEXING METHOD

(75) Inventors: Masaru Fukuoka, Ishikawa (JP); Isamu Yoshii, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 537 days.

(21) Appl. No.: 11/720,732

(22) PCT Filed: Dec. 1, 2005

(86) PCT No.: PCT/JP2005/022079
§ 371 (c)(1),
(2), (4) Date: Nov. 28, 2007

(87) PCT Pub. No.: WO2006/059680
PCT Pub. Date: Jun. 8, 2006

(65) Prior Publication Data
US 2009/0279527 A1    Nov. 12, 2009

(30) Foreign Application Priority Data
Dec. 3, 2004  (JP) .............................. 2004-351092

(51) Int. Cl.
*H04L 27/00* (2006.01)
*H04B 1/69* (2006.01)
(52) U.S. Cl. ...................................... 375/295; 375/146
(58) Field of Classification Search ................. 375/295, 375/296, 358, 377, 130, 140, 146; 370/208, 370/209, 335, 342, 441
See application file for complete search history.

(56) References Cited

U.S. PATENT DOCUMENTS

| | | | |
|---|---|---|---|
| 6,373,880 B1 | 4/2002 | Ichihara | |
| 7,023,265 B1 * | 4/2006 | Helard et al. | 329/320 |
| 7,123,580 B2 * | 10/2006 | Tang et al. | 370/210 |
| 7,158,474 B1 * | 1/2007 | Gerakoulis | 370/206 |
| 2002/0159425 A1 | 10/2002 | Uesugi et al. | |
| 2003/0053413 A1 | 3/2003 | Sawahashi et al. | |
| 2003/0185179 A1 | 10/2003 | Inogai et al. | |
| 2004/0042386 A1 | 3/2004 | Uesugi et al. | |
| 2004/0071078 A1 | 4/2004 | Sudo | |

* cited by examiner

*Primary Examiner*—Tesfaldet Bocure
(74) *Attorney, Agent, or Firm*—Dickinson Wright PLLC

(57) ABSTRACT

A wireless transmitting apparatus capable of improving the reception characteristic at a data stream receiving end. In this apparatus, I/Q separating parts (110, 112) each separate first data modulated symbols included in any of a plurality of data streams, which are to be multiplexed, into first in-phase components and first orthogonal components, while separating second data modulated symbols included in the other ones of the plurality of data streams into second in-phase components and second orthogonal components. An I/Q converting part (114) converts the first in-phase components to third orthogonal components, while converting the second orthogonal components to fourth in-phase components. A multi-code multiplexing part multi-code multiplexes the first and third orthogonal components to provide a first multiplexed signal, while multi-code multiplexing the second and fourth in-phase components to provide a second multiplexed signal. An I/Q combining part (124) combines the first and second multiplexed signals to provide a combined signal.

15 Claims, 9 Drawing Sheets

| MODULATION SCHEME FOR DATA STREAM A | MODULATION SCHEME FOR DATA STREAM B | SPREADING DOMAIN FOR MULTIPLEXED I-ch | SPREADING DOMAIN FOR MULTIPLEXED Q-ch |
|---|---|---|---|
| QPSK | QPSK | FREQUENCY DOMAIN | FREQUENCY DOMAIN |
| QPSK | 16QAM | FREQUENCY DOMAIN | TIME DOMAIN |
| 16QAM | 16QAM | TIME DOMAIN | TIME DOMAIN |

FIG.2

| ID# | | TOTAL DATA STREAMS $C_{mux}$ | REQUIRED $E_b/N_0$ OF DATA STREAM A[dB] | REQUIRED $E_b/N_0$ OF DATA STREAM B[dB] |
|---|---|---|---|---|
| 1 | TIME DOMAIN SPREADING $SF=T)$ | 3 | 7 | 12 |
| 2 | FREQUENCY DOMAIN SPREADING $SF=F)$ | 3 | 6 | 14 |

FIG.7

| ID# | DATA STREAM A $C_{mux}$ | | DATA STREAM B $C_{mux}$ | | REQUIRED $E_b/N_0$ OF DATA STREAM A [dB] | | REQUIRED $E_b/N_0$ OF DATA STREAM B [dB] | |
|---|---|---|---|---|---|---|---|---|
| | Ich ($F=F$) | Qch ($F=T$) | Ich ($F=F$) | Qch ($F=T$) | Ich ($F=F$) | Qch ($F=T$) | Ich ($F=F$) | Qch ($F=T$) |
| 3 | 4 | 0 | 0 | 2 | 8 | | | 11 |
| 4 | 3 | 1 | 0 | 2 | 6 | 7 | | 11.2 |
| 5 | 3 | 1 | 1 | 1 | 8 | 6.8 | 16 | 11 |
| 6 | 2 | 2 | 0 | 2 | 4 | 7.2 | | 11.4 |
| 7 | 2 | 2 | 1 | 1 | 6 | 7 | 14 | 11.2 |
| 8 | 2 | 2 | 2 | 0 | 8 | 6.8 | 16 | |
| 9 | 1 | 3 | 1 | 1 | 4 | 7.2 | 12 | 11 |
| 10 | 1 | 3 | 2 | 0 | 6 | 7 | 14 | |
| 11 | 0 | 4 | 2 | 0 | 4 | 7.2 | 12 | |

WIRELESS COMMUNICATION APPARATUS AND DATA MULTIPLEXING METHOD

TECHNICAL FIELD

The present invention relates to a radio communication apparatus and data multiplexing method used in receiving and transmitting spread data streams.

BACKGROUND ART

In recent years, in mobile communication using radio waves, various information other than voice data such as image data and moving image data etc. has become the target of communication. In accordance with this, high-speed and large capacity radio data communication is also sought after. It is known that when high-speed transmission is performed in mobile communication, the influence of wave delays due to multipath cannot be ignored, and the reception performance deterioration may be caused due to frequency selective fading.

OFDM (Orthogonal Frequency Division Multiplexing) schemes have been a focus of attention as an example of a technological measure for frequency selective fading, and of these, various investigations have taken place into the MC (Multi Carrier)-CDMA schemes (also referred to as the OFCDM scheme) that is the combination with the CDMA (Code Division Multiple Access) scheme. MC-CDMA schemes are mainly classified into spreading in the time domain and spreading in the frequency domain (for example, refer to Non-Patent Document 1).

In a radio transmitting method using frequency domain spreading, a plurality of chips generated by spreading a modulated symbol are mapped onto different subcarriers at the same time. On the other hand, in a radio transmitting method using time domain spreading, a plurality of chips are mapped in a time sequence at the same frequency.

Also, in the MC-CDMA scheme, a plurality of channel coded data streams by modulation schemes or other transmission parameters etc. set individually can be code-multiplexed in the same frame. The reception performance of data streams vary depending on the settings of modulation schemes and parameters. For instance, there are cases where an excellent reception performance is obtained by using frequency domain spreading, and there are also cases where excellent reception performance is obtained by using time domain spreading (see Non-Patent Document 2, for instance).

Non-Patent Document 1: "A study on time domain spreading for OFCDM", Technical Report of IEICE, RCS2001-179, 2001-11

Non-Patent Document 2: "VSF-OFCDM Using Two-Dimensional Spreading and Its Performance", Technical Report of IEICE, RCS2002-61, 2002-05

DISCLOSURE OF INVENTION

Problems to be Solved by the Invention

However, in the conventional radio transmission method, when a plurality of data streams are code-multiplexed, it is necessary to adjust the spreading domain for one data stream to the spreading domain for the others data streams to maintain orthogonality. To be more precise, when a plurality of data streams to be respectively code-multiplexed include data stream whose spreading domain improves the reception performance in the frequency domain and include data streams whose spreading domain improves the reception performance in the time domain at least one of the data streams is subjected to spreading in a domain where the reception performance improve, or to two-dimensional spreading (i.e., both frequency domain spreading and time domain spreading). Thus, there is a problem that the required $E_b/N_0$ (or the required $E_s/N_0$) of the data stream subjected to spreading in the domain where the reception performance does not improve or subjected to two-dimensional spreading, becomes large, and the reception performance fall.

An object of the present invention is to provide a radio communication apparatus and data multiplexing method which are capable of improving reception performance on the data stream receiving side.

Means for Solving the Problem

The radio communication apparatus of the present invention multiplexes first data and second data, and employs a configuration including: a dividing section that divides a modulated symbol of the first data into a first in-phase component and a first quadrature component and divides a modulated symbol of the second data into a second in-phase component and a second quadrature component; a converting section that converts the first in-phase component into a third quadrature component and converts the second quadrature component into a fourth in-phase component; a multiplexing section that performs multi-code multiplexing of the first quadrature component and the third quadrature component to obtain a first multiplexed signal, and performs multi-code multiplexing of the second in-phase component and the fourth in-phase component to obtain a second multiplexed signal; and a combining section that combines the first multiplexed signal and the second multiplexed signal to obtain a combined signal.

The data multiplexing method of the present invention multiplexes first data and second data includes the steps of: dividing a modulated symbol of the first data into a first in-phase component and a first quadrature component and dividing a modulated symbol of the second data into a second in-phase component and a second quadrature component; converting the first in-phase component into a third quadrature component and converting the second quadrature component into a fourth in-phase component; performing multi-code multiplexing of the first quadrature component and the third quadrature component to obtain a first multiplexed signal, and performing multi-code multiplexing of the second in-phase component and the fourth in-phase component to obtain a second multiplexed signal; and combining the first multiplexed signal and the second multiplexed signal to obtain a combined signal.

Advantageous Effects of the Invention

According to the present invention, reception performance on the data stream receiving side can be improved.

BRIEF DESCRIPTION OF DRAWINGS

FIG. 2 is a view showing the correspondences between the modulation schemes for data streams and the spreading domains set individually for signal components according to Embodiment 1 of the present invention;

FIG. 7 is a view showing multiplexing patterns in a case where signal components of data streams are not individually spread according to Embodiment 2 of the present invention;

FIG. 8 is a view showing multiplexing patterns in a case where signal components of data streams are individually spread according to Embodiment 2 of the present invention.

BEST MODE FOR CARRYING OUT THE INVENTION

Preferred embodiments of the present invention will be described below in detail with reference to the accompanying drawings.

Embodiment 1

Figure 1:
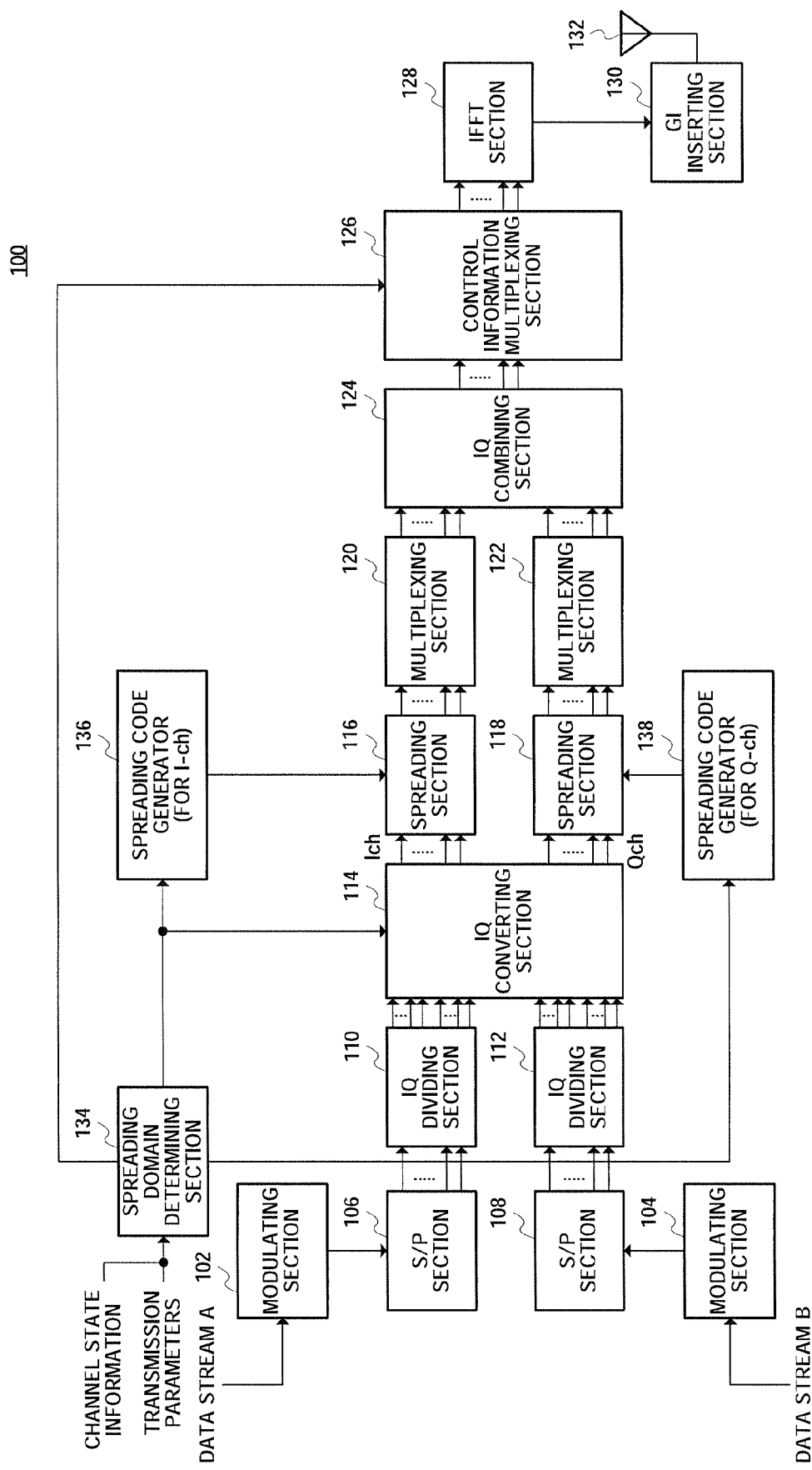
FIG. 1 is a block diagram showing the configuration of a radio communication apparatus according to Embodiment 1 of the present invention.

FIG. 1 is a block diagram showing a configuration of a MC-CDMA scheme radio communication apparatus according to Embodiment 1 of the present invention. Radio communication apparatus 100 of the present embodiment is used as a radio transmission apparatus for multiplexing and transmitting a plurality of data streams. Although a case will be described here with the present embodiment as an example where two data streams A and B are multiplexed, there may be 3 or more data streams to be multiplexed.

Radio communication apparatus 100 includes modulating sections 102 and 104, serial-to-parallel converting (S/P) sections 106 and 108, IQ dividing sections 110 and 112, IQ converting section 114, spreading sections 116 and 118, multiplexing sections 120 and 122, IQ combining section 124, control information multiplexing section 126, Inverse Fast Fourier Transform (IFFT) section 128, Guard Interval (GI) inserting section 130, antenna 132, spreading domain determining section 134, and spreading code generators 136 and 138. The configuration including a combination of converting section 102, S/P section 106 and IQ dividing section 110 is provided for processing data stream A individually, and the configuration including a combination of converting section 104, S/P section 108 and IQ dividing section 112 is provided for processing data stream B individually.

Modulating section 102 modulates data signals included in data stream A and generates modulated symbols formed with the in-phase components (I-ch component) and the quadrature components (Q-ch component). To be more precise, modulating section 102 modulates data stream A by a modulation scheme selected in accordance with the channel state between radio transmission apparatus 100 and the destination of data stream A. The modulation schemes for use include QPSK (Quadrature Phase Shift Keying) and 16 QAM (Quadrature Amplitude Modulation) etc. Modulating section 102 performs data modulation by mapping data onto a constellation corresponding to the selected modulation scheme.

Modulating section 104 modulates data signals included in data stream B and generates modulated symbols formed with the in-phase components (I-ch component) and the quadrature components (Q-ch component). To be more precise, modulating section 104 modulates data stream B by a modulation scheme selected in accordance with the channel state between radio transmission apparatus 100 and the destination of data stream B. The modulation schemes for use include QPSK and 16 QAM etc. Modulating section 104 performs data modulation by mapping data on a constellation corresponding to the selected modulation scheme. Data stream B is a data stream subjected to a channel codec using different transmission parameters from those for data stream A.

S/P section 106 performs serial-to-parallel conversion on modulated symbols generated by modulating section 102. Also, S/P section 108 performs serial-to-parallel conversion on modulated symbols generated by modulating section 104.

IQ dividing section 110 divides modulated symbols subjected to serial-to-parallel conversion in S/P section 106 into the I-ch component and the Q-ch component. The I-ch component and the Q-ch component obtained by the division in IQ dividing section 110 are outputted to IQ converting section 114. Also, IQ dividing section 112 divides modulated symbols subjected to serial-to-parallel conversion in S/P section 108 into the I-ch component and the Q-ch component. The I-ch component and the Q-ch component obtained by the division in IQ dividing section 112 are outputted to IQ converting section 114.

Spreading domain determining section 134 determines the spreading domains for data streams A and B in accordance with transmission parameters set for data streams A and B and information showing the channel state (channel state information), and outputs control information indicating the results to IQ converting section 114, spreading code generators 136 and 138 and control information multiplexing section 126.

The transmission parameters, for example, include the modulation coding scheme, spreading factor, and the number of multiplexed codes for transmission data. The transmission parameters depend on, for example, the amount of data demanded from a receiving side and the amount of data transmitted from a transmitting side. For example, for a user who wants to receive email (that is, a data stream receiving side), a small volume of information is sufficient and QPSK which has a smaller M-ary number than 16 QAM is used, and for a user who wants to make video calls, a large amount of information is required and 16 QAM which has a greater M-ary number than QPSK is used. The spreading domain setting is performed in accordance with these transmission parameters. For example, the priority of time domain spreading or frequency domain spreading changes in accordance with the change in the M-ary number. To be more precise, when a modulation scheme having a M-ary number equal to or greater than a predetermined value is used, setting is performed such that the priority of time domain spreading is raised (in other words, the priority of frequency domain spreading is lowered) and time domain spreading is actively used.

Further, information indicating channel state include channel state information (delay spread, Doppler frequency, etc.) per receiving user are given as an example. Information indicating the channel state depends on users' environment, including, for example, the distance from radio communication apparatus 100, line of sight environment or shadowing environment, cell edge, or fast-moving environment, and is fed back from the user. The spreading domain setting is performed in accordance with this information indicating the channel state. For example, the priority of time domain spreading or frequency domain spreading changes in accordance with changes in delay spread or the Doppler frequency. To be more precise, when delay spread is equal to or greater than a predetermined value, orthogonality is more likely to fail in frequency domain spreading than in time domain spreading, and so setting is performed such that the priority of time domain spreading is raised (in other words, the priority of frequency domain spreading is lowered) and time domain spreading is actively used. Further, when the Doppler frequency is equal to or greater than a predetermined value, orthogonality is more likely to fail in time domain spreading than in frequency domain spreading, and so setting is performed such that the priority of frequency direction spreading is raised (in other words, the priority of time domain spreading is lowered) and frequency domain spreading is actively used.

Although channel state information cannot be acquired when feedback information is not obtained in early communication or feedback information could not be received from the user, even in this case, transmission parameters for the downlink are determined and therefore, it is possible to set the spreading domain.

IQ converting section 114 performs IQ conversion on either one of the I-ch component and the Q-ch component inputted from IQ dividing section 110 in accordance with control information inputted from spreading domain determining section 134. For instance, to convert the Q-ch component into an I-ch component, an I-ch component is obtained by rotating the phase of the inputted Q-ch component by 90 degrees. In this case, the I-ch component inputted from IQ dividing section 110 and the I-ch component obtained by IQ conversion are outputted to spreading section 116.

Also, IQ converting section 114 performs IQ conversion on either one of the I-ch component and the Q-ch component inputted from IQ dividing section 112 in accordance with control information inputted from spreading domain determining section 134. For instance, to convert the I-ch component into a Q-ch component, a Q-ch component is obtained by rotating the phase of the inputted I-ch component by 90 degrees. In this case, the Q-ch component inputted from IQ dividing section 112 and the Q-ch component obtained by IQ conversion are outputted to spreading section 118.

Spreading code generator 136 generates the spreading code used in spreading the I-ch components. The spreading factor in the frequency domain or the spreading factor in the time domain for the spreading code are determined in accordance with control information inputted from spreading domain determining section 134. To be more precise, when the spreading domain for the I-ch component is determined to be the frequency domain, a spreading code having a spreading factor $SF_F$ in the frequency domain is generated in association with the I-ch components, and is outputted to spreading section 116. Alternatively, when the spreading domain for the I-ch components is determined to be the time domain, a spreading code having a spreading factor $SF_T$ in the time domain is generated in association with the I-ch components, and is outputted to spreading section 116. Although both spreading factors $SF_F$ and $SF_T$ may be fixed values or variable values in the present embodiment, to simplify the description, they are fixed values.

Spreading code generator 138 generates the spreading code used in spreading the Q-ch components. The spreading factor in the frequency domain for the spreading code or the spreading factor in the time domain is determined in accordance with control information inputted from spreading domain determining section 134. To be more precise, when the spreading domain for the Q-ch components is determined to be the frequency domain, a spreading code having a spreading factor $SF_F$ in the frequency domain is generated in association with the Q-ch components and is outputted to spreading section 118. Alternatively, when the spreading domain for the Q-ch component is determined to be the time domain, a spreading code having a spreading factor $SF_T$ in the time domain is generated in association with the Q-ch components, and is outputted to spreading section 118. Although both spreading factors $SF_F$ and $SF_T$ to be used may be fixed values or variable values in the present embodiment, to simplify the description, they are fixed values.

Spreading section 116 spreads the I-ch components inputted from IQ converting section 114 using the spreading code inputted from spreading code generator 136 and generates I-ch spread chips.

Also, spreading section 118 spreads the Q-ch components inputted from IQ converting section 114 using the spreading code inputted from spreading code generator 138 and generates Q-ch spread chips.

Multiplexing section 120 multiplexes the I-ch spread chips generated by spreading section 116 with each other and generates an I-ch multiplex signal. That is, the combination of spreading code generator 136, spreading section 116 and multiplexing section 120 constitutes a multi-code multiplexing section for performing multi-code multiplexing of the I-ch components.

Multiplexing section 122 multiplexes the Q-ch spread chips generated by spreading section 118 with each other and generates a Q-ch multiplexing signal. That is, the combination of spreading code generator 138, spreading section 118 and multiplexing section 122 constitutes a multi-code multiplexing section for performing multi-code multiplexing of the Q-ch components.

IQ combining section 124 combines the I-ch multiplexing signal generated by multiplexing section 120 and the Q-ch multiplexing signal generated by multiplexing section 122, and generates a combined signal.

Control information multiplexing section 126 multiplexes control information inputted from spreading domain determining section 134 with the combined signal generated by IQ combining section 124, and generates a transmission signal.

IFFT section 128 performs IFFT on the transmission signal generated by control information multiplexing section 126. GI inserting section 130 inserts a GI into a predetermined position of the transmission signal after IFFT, and performs predetermined radio processing (D/A conversion, up-conversion) on the transmission signal after the GI insertion, and transmits the transmission signal through antenna 132.

Figure 3:
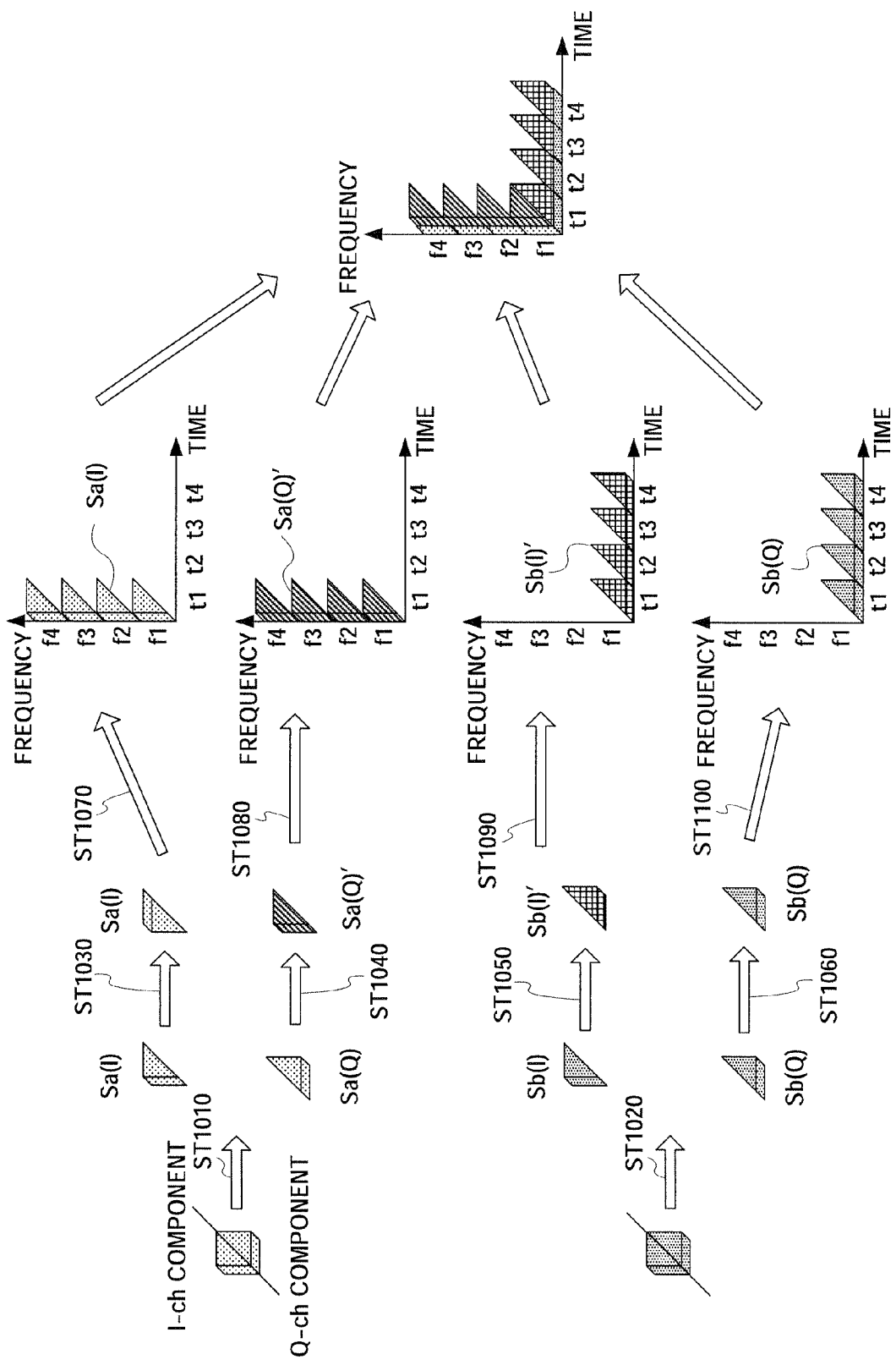
FIG. 3 is a view for describing the spreading multiplexing processing operation in the radio communication apparatus according to Embodiment 1 of the present invention.

Next, the spread multiplexing processing operation in radio communication apparatus 100 having the above configuration will be described with reference to FIG. 2 and FIG. 3. A case will be described here where the spreading domain for the signal components of the combined signal (i.e., the multiplexed I-ch component and the multiplexed Q-ch component) are determined in accordance with the modulation schemes of data streams. FIG. 2 is a view showing the correspondences between modulation schemes of data streams and the spreading domain set individually for signal components, and FIG. 3 is a view for describing the spread multiplexing processing operation in radio communication apparatus 100.

In these examples, spreading domain determining section 134 determines that the spreading domain for the multiplexed I-ch component is the frequency domain and the spreading domain for the multiplexed Q-ch component is the time domain. However, spreading domain determining section 134 can also determine the spreading domain for the multiplexed I-ch component and the spreading domain for the multiplexed Q-ch component in accordance with the data amount of data streams, spreading factor, delay spread at the destination or the Doppler frequency at the destination instead of in accordance with the modulation schemes of data streams.

First, the modulated symbols of the data signal included in datastream A is divided into the I-ch component (Sa(I)) and the Q-ch component (Sa(Q)) by IQ dividing section 110 (ST1010), and the modulated symbols of the data signal included in data stream B is divided into the I-ch component (Sb(I)) and the Q-ch component (Sb(Q)) by IQ dividing section 112 (ST1020).

Here, the modulation scheme used for the modulated symbols of the data signal included in data stream A is QPSK, and the modulation scheme used for the modulated symbols of the data signal included in data stream B is 16 QAM. In this case, as shown in FIG. 2, spreading domain determining section 134 determines that the spreading domain for the multiplexed I-ch component is the frequency domain and that the spreading domain for the multiplexed Q-ch component is the time domain.

Therefore, Sa(I) is not subjected to IQ conversion by IQ converting section 114, and is outputted as is to spreading section 116 (ST1030). On the other hand, Sa(Q) is subjected to IQ conversion by IQ converting section 114 and is converted into an I-ch component (Sa(Q)') by phase rotation, and Sa(Q)' is outputted to spreading section 116 (ST1040).

Also, Sb(I) is subjected to IQ conversion by IQ converting section 114 and is converted into a Q-ch component (Sb(I)') by phase rotation, and Sb(I)' is outputted to spreading section 118 (ST1050). On the other hand, Sb(Q) is not subjected to IQ conversion by IQ converting section 114 and is outputted as is to spreading section 118 (ST1060).

In spreading section 116, Sa(I) is spread in the frequency domain (ST1070) and Sa(Q)' is spread in the frequency domain (ST1080). The spreading code used in spreading Sa(I) and the spreading code used in spreading Sa(Q)' are orthogonal to each other.

In spreading section 118, Sb(I)' is spread in the time domain (ST1090) and Sb (Q) is spread in the time domain (ST1100). The spreading code used in spreading Sb(I)' and the spreading code used in spreading Sb(Q) are orthogonal to each other.

In multiplexing section 120, Sa(I) and Sa(Q)' which are spread in the frequency domain are multiplexed with each other and a multiplex signal corresponding to the in-phase component of the combined signal is obtained. On the other hand, in multiplexing section 122, Sb(I)' and Sb(Q) which are spread in the time domain are multiplexed with each other and a multiplex signal corresponding to the quadrature component of the combined signal is obtained. The multiplexing signals are combined by IQ combining section, producing a combined signal.

As described above, according to the present embodiment, for the data streams to be multiplexed with each other, the modulated symbol is divided into the in-phase component and the quadrature component, one of the components is converted to obtain the other component, and a multiplex signal is obtained by performing multi-code multiplexing with the component not subjected to conversion and the component obtained by conversion. That is, the signal components of each data stream is gathered to either the in-phase component or the quadrature component and a multiplex signal of a plurality of data streams is generated (i.e., the above combined signal), so that it is possible to maintain an orthogonal relationship between the multiplexed I-ch component and the multiplexed Q-ch component. For this reason, when the optimum spreading domain differs between a plurality of data streams to be code-multiplexed, it is possible to remove the necessity to match the spreading domains for all data streams to the optimum spreading domain for one data stream, minimize the increase of the $E_b/N_0$ (or required $E_s/N_0$) each data stream requires, and improve reception performance on the data stream receiving side.

Also, according to the present embodiment, the signal components of one data stream are gathered in the I-ch component, and the signal components of another data stream is gathered in the Q-ch component. Further, the I-ch component is spread in the spreading domain set individually for the multiplexed I-ch component, and the Q-ch component is spread in the spreading domain set individually for the multiplexed Q-ch component. Thus, it is possible to perform spreading in the domain where the reception performance improves for data streams.

Embodiment 2

Figure 4:
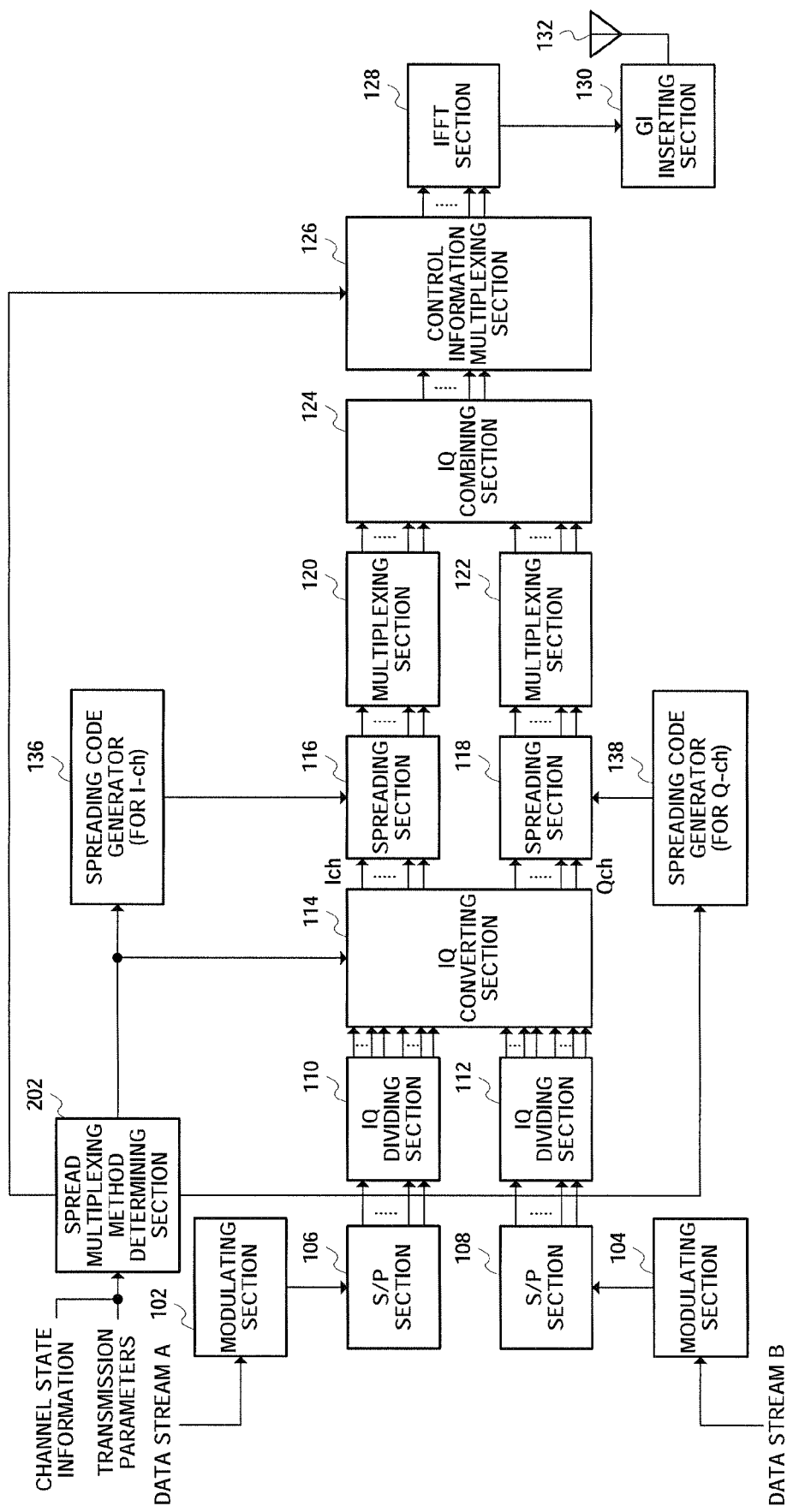
FIG. 4 is a block diagram showing the configuration of a radio communication apparatus according to Embodiment 2 of the present invention.

FIG. 4 is a block diagram showing the configuration of a radio communication apparatus according to Embodiment 2 of the present invention. The radio communication apparatus described in this embodiment has the same basic configuration as that of radio transmitting apparatus 100 described in Embodiment 1. Therefore, the same components as those described in Embodiment 1 are assigned the same reference numerals and the details thereof will be omitted. Also, in the present embodiment, although a case similar to Embodiment 1 will be described as an example where two data streams A and B are multiplexed, there may be 3 or more data streams.

Radio communication apparatus 200 of FIG. 4 has spread multiplexing method determining section 202, in place of spreading domain determining section 134 described in Embodiment 1.

Spread multiplexing method determining section 202 determines the spread multiplexing method for each data stream A and B, such as the spreading domain and the number of multiplexed codes, in accordance with transmission parameters set for each data stream A and B and information indicating the channel state (channel state information), and outputs control information indicating these result to IQ converting section 114, spreading code generators 136 and 138 and control information multiplexing section 126. Next, the spread multiplexing method determination operation of spread multiplexing method determining section 202 will be described with reference to FIG. 5, FIG. 6, FIG. 7 and FIG. 8.

Figure 5:
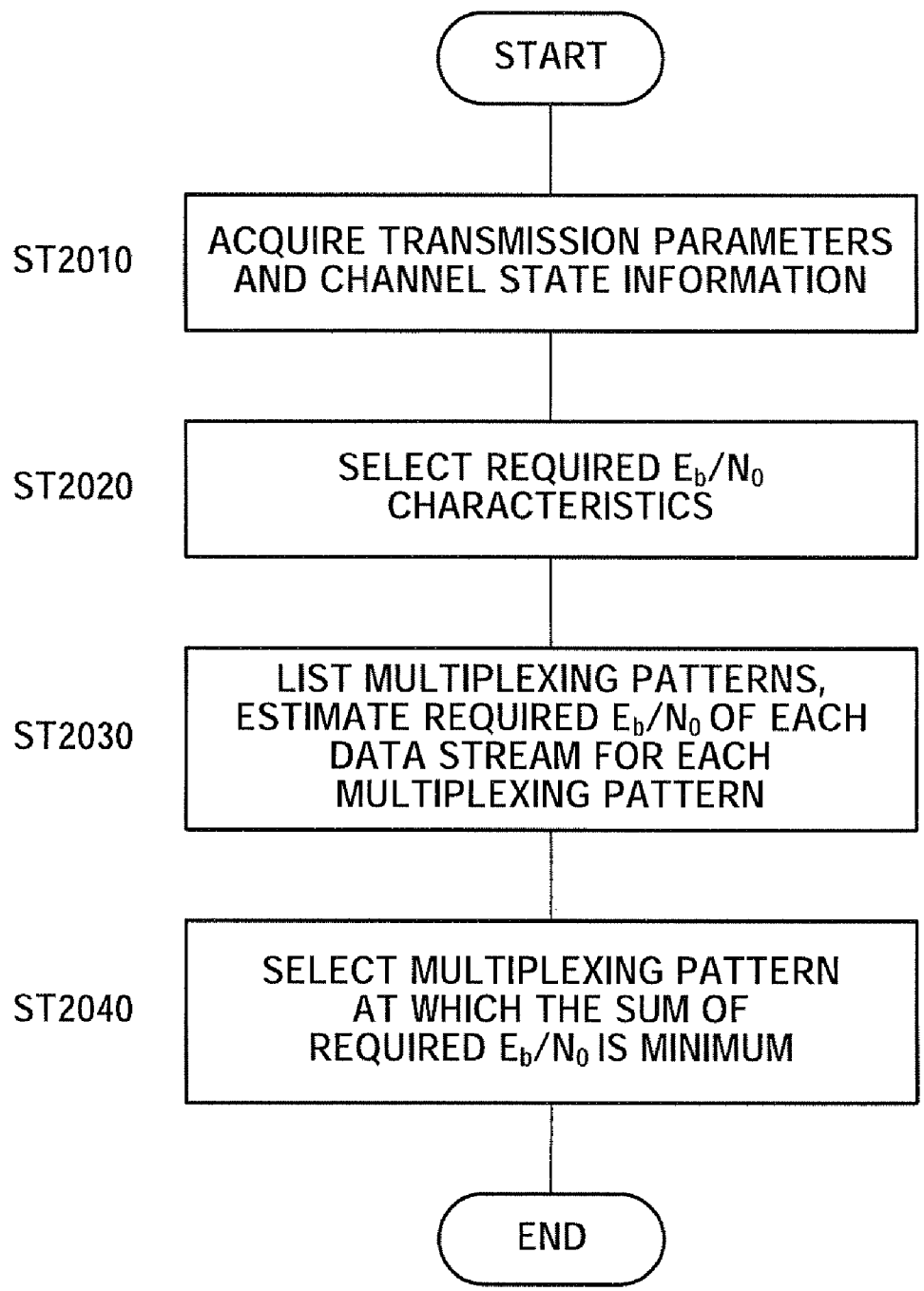
FIG. 5 is a flow chart for describing the operation in a spread multiplexing method determining section according to Embodiment 2 of the present invention

FIG. 5 is a flow chart describing the spread multiplexing method determining operation of spread multiplexing method determining section 202.

First, the transmission parameters and the channel state information are obtained (ST2010). Here, the modulation scheme (QPSK), the coding rate (½), the spreading factor (4) and the number of multiplexed codes (2) are obtained as transmission parameters for data stream A. Also, delay spread (300 ns) and the Doppler frequency (100 Hz) are obtained as channel state information at the destination of data stream A. Also, the modulation scheme (16 QAM), the coding rate (⅓), the spreading factor (4) and the number of multiplexed codes (1) are obtained as transmission parameters for data stream B. Delay spread (30 ns) and the Doppler frequency (300 Hz) are obtained as channel state information at the destination of data stream B. The data amount of data streams is specified by the product of the spreading factor and the number of multiplexed codes. That is, data stream A has a data amount corresponding to two spreading codes with a spreading factor "4", and data stream B has a data amount corresponding to one spreading code with a spreading factor "4".

Figure 6:
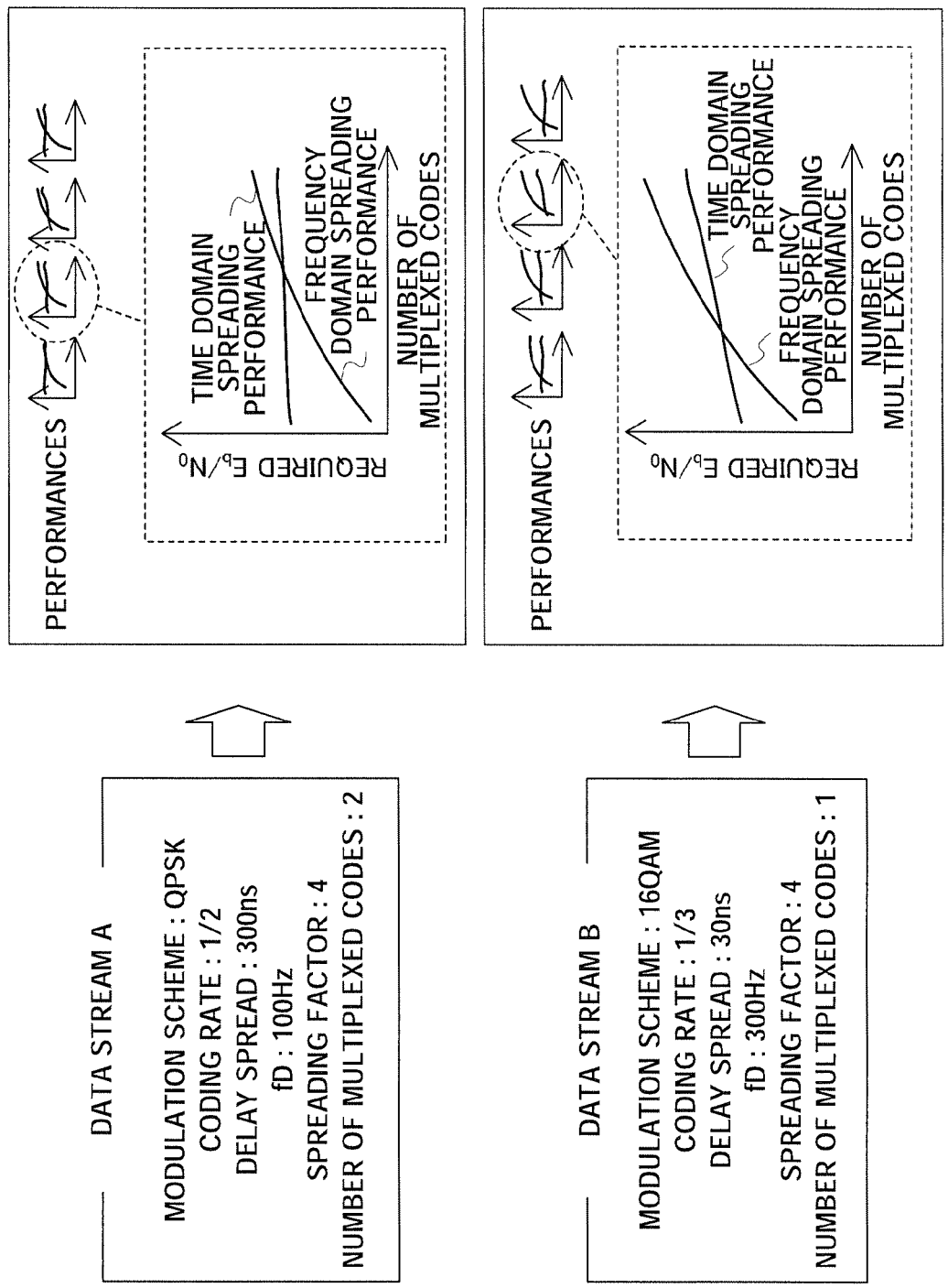
FIG. 6 is a view for describing the selection of the required $E_b/N_0$ characteristic according to Embodiment 2 of the present invention.

Then, the required $E_b/N_0$ characteristic is selected in accordance with obtained transmission parameters and channel state information (ST2020). To be more precise, a plurality of required $E_b/N_0$ characteristics are stored in advance in spread multiplexing method determining section 202. Then, as shown in FIG. 6, for each data stream A and B, the required $E_b/N_0$ characteristic corresponding to obtained transmission parameters and channel state information is selected from the stored characteristics.

Next, all multiplexing patterns will be described. The required $E_b/N_0$ for each data stream A and B is estimated per multiplexing pattern (ST2030). Examples of multiplexing patterns are shown in FIG. 7 and FIG. 8. FIG. 7 shows examples of multiplexing patterns (ID#1, ID#2) when signal components of data streams A and B are not individually spread, and FIG. 8 shows multiplexing patterns (ID#3-ID#11) when signal components of data streams are individually spread.

Next, the multiplexing pattern at which the sum of the required $E_b/N_0$ is the lowest is selected from the required $E_b/N_0$ s estimated for multiplexing patterns (ST2040). Alternatively, it is preferable to select a multiplexing pattern which can satisfy the received SNR by referring to the received SNR fed-back from the user. Here, for instance, the multiplexing pattern of ID#4 is selected.

In this way, according to the present embodiment, the spreading domain for the I-ch component of the combined signal and the spreading domain for the Q-ch component of the combined signal are determined in accordance with the required $E_b/N_0$ for both data streams A and B estimated in accordance with the data amount of both data streams A and B, and signal components of data streams A and B are spread in accordance with the determined domains.

Also, the spreading domain for the I-ch component of the combined signal and the spreading domain for the Q-ch component of the combined signal are determined in accordance with the required $E_b/N_0$ of both data streams A and B estimated in accordance with the modulation schemes of both data streams A and B, and signal components of data streams A and B are spread in accordance with the determined domains.

The spreading domain for the I-ch component of the combined signal and the spreading domain for the Q-ch component of the combined signal are determined in accordance with the required $E_b/N_0$ of both data streams A and B estimated in accordance with the coding rates of both data streams A and B, and the signal components of data streams A and B are spread in accordance with the determined domains.

The spreading domain for the I-ch component of the combined signal and the spreading domain for the Q-ch component of the combined signal are determined in accordance with the required $E_b/N_0$ of both data streams A and B estimated in accordance with the spreading factors of both data streams A and B, and data streams A and B are spread in accordance with the determined domains.

The spreading domain for the I-ch component of the combined signal and the spreading domain for the Q-ch component of the combined signal are determined in accordance with the required $E_b/N_0$ of both data streams A and B estimated in accordance with delay spread at the destinations of both data streams A and B, and signal components of data streams A and B are spread in accordance with the determined domains.

The spreading domain for the I-ch component of the combined signal and the spreading domain for the Q-ch component of the combined signal are determined in accordance with the required $E_b/N_0$ of both data streams A and B estimated in accordance with the Doppler frequency at the destinations of both data streams A and B, and signal components of data streams A and B are spread in accordance with the determined domains.

Also, the number of multiplexed codes for the I-ch component of the combined signal and the number of multiplexed codes for the Q-ch component of the combined signal are determined in accordance with the required $E_b/N_0$ of both data streams A and B estimated in accordance with the data amount of both data streams A and B, and signal components of data streams A and B are subjected to multi-code multiplexing in accordance with the determined number of multiplexed codes.

The number of multiplexed codes for the I-ch component of the combined signal and the number of multiplexed codes for the Q-ch component of the combined signal are determined in accordance with the required $E_b/N_0$ of both data streams A and B estimated in accordance with modulation schemes of both data streams A and B, and signal components of data streams A and B are subjected to multi-code multiplexing in accordance with the determined number of multiplexed codes.

Also, the number of multiplexed codes for the I-ch component of the combined signal and the number of multiplexed codes for the Q-ch component of the combined signal are determined in accordance with the required $E_b/N_0$ of both data streams A and B estimated in accordance with coding rates of both data streams A and B, and signal components of data streams A and B are subjected to multi-code multiplexing in accordance with the determined number of multiplexed codes.

The number of multiplexed codes for the I-ch component of the combined signal and the number of multiplexed codes for the Q-ch component of the combined signal are determined in accordance with the required $E_b/N_0$ of both data streams A and B estimated in accordance with spreading factors of both data streams A and B, and signal components of data streams A and B are subjected to multi-code multiplexing in accordance with the determined number of multiplexed codes.

The number of multiplexed codes for the I-ch component of the combined signal and the number of multiplexed codes for the Q-ch component of the combined signal are determined in accordance with the required $E_b/N_0$ of both data streams A and B estimated in accordance with delay spread at the destinations of data streams A and B, and signal components of data streams A and B are subjected to multi-code multiplexing in accordance with the determined number of multiplexed codes.

The number of multiplexed codes for the I-ch component of the combined signal and the number of multiplexed codes for the Q-ch component of the combined signal are determined in accordance with the required $E_b/N_0$ of both data streams A and B estimated in accordance with the Doppler frequency at the destinations of data streams A and B, and signal components of data streams A and B are subjected to multi-code multiplexing in accordance with the determined number of multiplexed codes.

Accordingly, it is possible to derive the optimum spread multiplexing method, in accordance with the relationships between a plurality of data streams to be multiplexed with each other.

Although a case has been described with the present embodiment as an example where the required $E_b/N_0$ is used as a received quality index, the required $E_s/N_0$ may also be used in place of the required $E_b/N_0$, or it may also be SNR (Signal to Noise Ratio).

Embodiment 3

Figure 9:
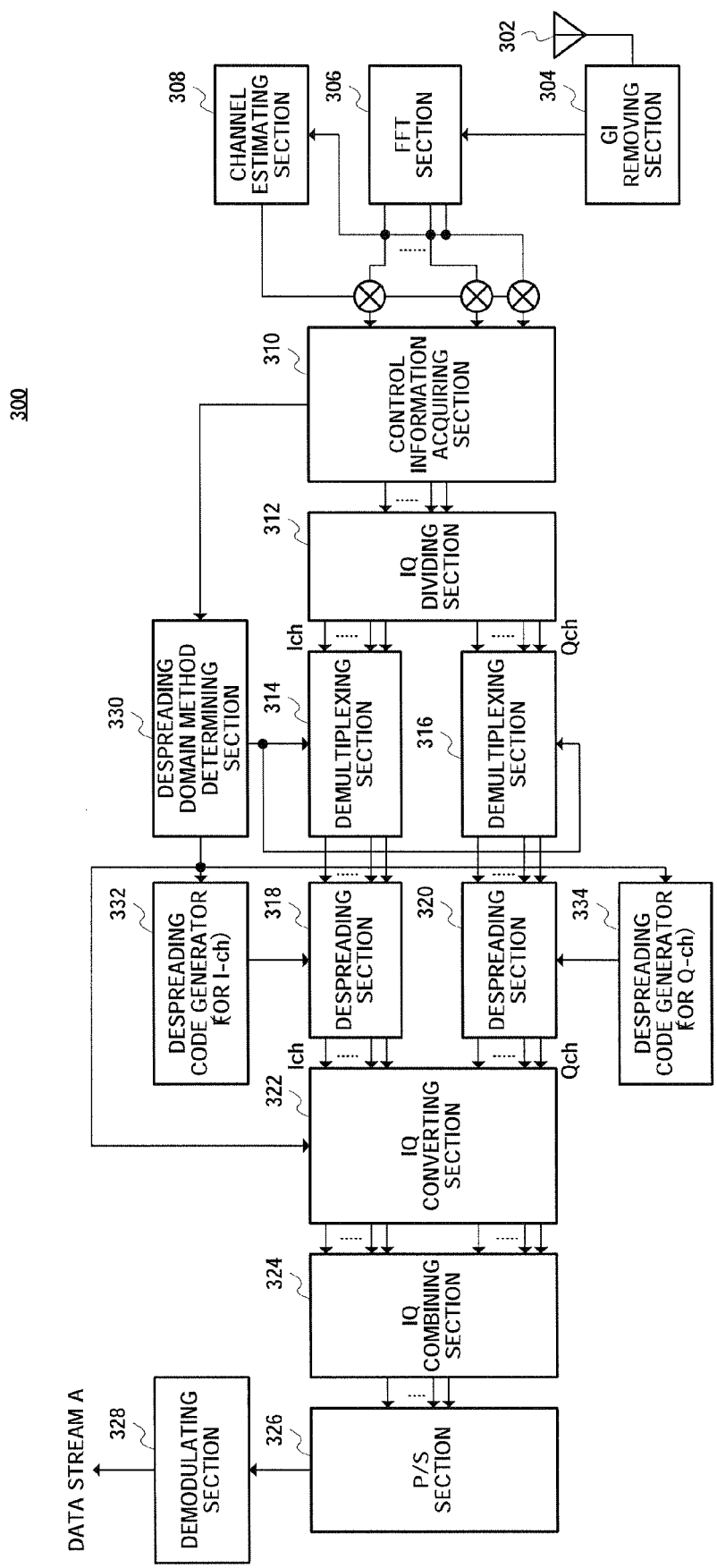
FIG. 9 is a block diagram showing the configuration of a radio communication apparatus according to Embodiment 3 of the present invention.

FIG. 9 is a block diagram showing the configuration of a radio communication apparatus according to Embodiment 3 of the present invention. Although cases have been described with Embodiments 1 and 2 where radio communication apparatuses 100 and 200 are used as radio transmission apparatuses for multiplexing a plurality of data streams and transmitting them, in the present embodiment, a radio communication apparatus used as a radio receiving apparatus for receiving data stream A from among the signals transmitted from radio communication apparatus 100 or radio communication apparatus 200 will be described.

Radio communication apparatus 300 of FIG. 9 includes antenna 302, GI removing section 304, fast Fourier transform (FFT) section 306, channel estimating section 308, control information acquiring section 310, IQ dividing section 312, demultiplexing sections 314 and 316, despreading sections 318 and 320, IQ converting section 322, IQ combining section 324, parallel-to-serial (P/S) converting section 326, demodulating section 328, despreading domain method determining section 330 and despreading code generators 332 and 334.

GI removing section 304 receives a transmission signal of radio communication apparatus 100 (or radio communication apparatus 200) through antenna 302, and performs predetermined radio processing (down-conversion, A/D conversion, etc.) on the received signal, and removes the GI inserted in the predetermined position of the received signal after radio-processing. FFT section 306 performs FFT on the received signal after GI removal. Channel estimating section 308 performs channel estimation using the received signal after FFT, and the signal is weighed per sub-carriers (or also denoted as "tone").

Control information acquiring section 310 acquires control information from the received signal after FFT (in this embodiment, after FFT and weighting). Control information acquired from the received signal is outputted to despreading domain method determining section 330.

IQ dividing section 312, as an extracting means, divides the received signal after control information is acquired, and extracts the I-ch multiplexing signal formed with the multiplexed I-ch spread chips or the Q-ch multiplexing signal formed with the multiplexed Q-ch spread chips. Then, the I-ch multiplexing signal is outputted to demultiplexing section 314 and the Q-ch multiplexing signal to demultiplexing section 316, respectively.

Despreading domain method determining section 330 determines the spreading domain or the spread multiplexing method specified in the control information inputted from control information acquiring section 310, as the despreading domain or the despreading method (i.e., the despreading domain or the demultiplexing method), and reports the result to demultiplexing sections 314 and 316, despreading code generators 332 and 334 and IQ converting section 322.

Demultiplexing section 314 demultiplexes on the I-ch multiplexed received signals in accordance with the despreading domain or the despreading method reported from the despreading domain method determining section 330. In demultiplexing, for instance, when the signal components of data stream A are multiplexed with two codes in the state where the signal components of data stream A are gathered in the I-ch component, the I-ch multiplex signal is copied into two. Also, for instance, when the signal components of data stream A are multiplexed with four codes in the state where the signal components of data stream A are gathered in the I-ch component, the I-ch multiplex signal is copied into four. Further, for instance, when the signal components of data stream A are multiplexed in the state where the signal components of data stream A are gathered in the Q-ch component, copying of the I-ch multiplex signal is not executed. The I-ch multiplex signal subjected to demultiplexing is outputted to despreading section 318.

Demultiplexing section 316 demultiplexes the Q-ch multiplex signal in accordance with the despreading domain or the despreading method reported from despreading domain method determining section 330. In demultiplexing, for instance, when the signal components of data stream A are multiplexed with two code in the state where the signal components of data stream A are gathered in the Q-ch component, the Q-ch multiplex signal is copied into two. Also, for instance, when the signal component of data stream A are multiplexed with four codes in the state where the signal components of data stream A are gathered in the Q-ch component, the Q-ch multiplex signal is copied into four. Also, for instance, when the signal components of data stream A are multiplexed in the state where the signal components of the data stream A are gathered in the I-ch component, copying of the Q-ch multiplexing signal is not executed. The Q-ch multiplex signals subjected to demultiplexing are outputted to despreading section 320.

Despreading code generator 332 generates spreading codes for the I-ch spread chips constituting the I-ch multiplexing signals in accordance with the despreading domain or the despreading method reported from despreading domain method determining section 330. Generated spreading codes are outputted to despreading section 318. Also, despreading code generator 334 generates spreading codes for the Q-ch spread chips constituting the Q-ch multiplex signals in accordance with the despreading domain or despreading method reported from despreading domain method determining section 330. Generated spreading codes are outputted to despreading section 320.

Despreading section 318 despreads the I-ch multiplexing signals subjected to demultiplexing are demultiplexing section 314 using the spreading codes inputted from despreading code generator 332. For instance, when the signal components of data stream A are multiplexed with two codes in the state where the signal components of data stream A are gathered in I-ch component, one of the two I-ch multiplexing signals is despread using one of the two generated spreading codes and the other I-ch multiplexing signal is despread using the other spreading code. The I-ch components obtained by despreading are outputted to IQ converting section 322.

Despreading section 320 despreads the Q-ch multiplex signal subjected to demultiplexing in demultiplexing section 316 using the spreading codes inputted from despreading code generator 334. For instance, when the signal components of data stream A are multiplexed with two codes in the state where the signal components of data stream A are gathered in the Q-ch component, one of the two Q-ch multiplex signals is despread by one of the two generated spreading codes and the other Q-ch multiplex signal is despread by the other spreading code. The Q-ch components obtained by despreading are outputted to IQ converting section 322.

IQ converting section 322 performs IQ conversion of the I-ch components inputted from despreading section 318 or the Q-ch components inputted from despreading section 320 in accordance with the despreading domain or the despreading method reported from despreading domain method determining section 330. For instance, when the Q-ch component of the signal components of data stream A are converted into the I-ch components in radio communication apparatus 100 (or radio communication apparatus 200), IQ converting section 322 converts the I-ch component which are inputted from despreading section 318 and converted from the Q-ch into the Q-ch component. This conversion is realized, for instance, by rotating the phase of the I-ch component by −90 degrees. Also, when the I-ch component of the signal components of data stream A are converted into the Q-ch component in radio communication apparatus 100 (or radio communication apparatus 200), IQ converting section 322 converts the Q-ch component which are inputted from despreading section 320 and converted from the I-ch component into the I-ch component. This conversion is realized, for instance, by rotating the phase of the Q-ch component by −90 degrees. The I-ch components and Q-ch components are outputted to IQ combining section 324.

IQ combining section 324 combines the I-ch components and the Q-ch components outputted from IQ converting section 322 and generates modulated symbols. To be more specific, the combination of the I-ch component and Q-ch component constituting a modulated symbol generated by modulating section 102 of radio communication apparatus 100 (or radio communication apparatus 200), is extracted and IQ combining is performed per extracted combination. The modulated symbols generated by this combination are outputted to P/S section 326.

P/S section 326 performs parallel-to-serial conversion of the modulated symbols generated by IQ combining section 324. Demodulating section 328 demodulates data stream A from the modulated symbols subjected to parallel-to-serial conversion.

As described above, according to the present embodiment, from the combined signal transmitted from radio communication apparatuses 100 and 200 (that is, from the data streams A and B which are multiplexed so that the multiplexed I-ch and the multiplexed Q-ch are orthogonal to each other), data stream A can be appropriately received.

The embodiments of the present invention have been described.

The radio communication apparatus and the data multiplexing method according to the present invention are not limited to the above Embodiments 1 to 3, and can be changed and implemented in various ways. For example, the embodiments can be appropriately combined and implemented.

Also, in the above embodiments, a case has been described as an example where the present invention is configured by hardware. However, the present invention can also be realized by software.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

This application is based on Japanese Patent Application No. 2004-351092 filed on Dec. 3, 2004, the entire content of which is expressly incorporated herein by reference.

INDUSTRIAL APPLICABILITY

The radio communication apparatus and the data multiplexing method of the present invention can be applied to a base station apparatus or a mobile station apparatus etc. for transmitting and receiving spread data streams.

The invention claimed is:

1. A radio communication apparatus that multiplexes first data and second data, the radio communication apparatus comprising:
    a dividing section that divides a modulated symbol of the first data into a first in-phase component and a first quadrature component and divides a modulated symbol of the second data into a second in-phase component and a second quadrature component;
    a converting section that converts the first in-phase component into a third quadrature component and converts the second quadrature component into a fourth in-phase component;
    a multiplexing section that performs multi-code multiplexing of the first quadrature component and the third quadrature component to obtain a first multiplexed signal, and performs multi-code multiplexing of the second in-phase component and the fourth in-phase component to obtain a second multiplexed signal; and
    a combining section that combines the first multiplexed signal and the second multiplexed signal to obtain a combined signal.

2. The radio communication apparatus according to claim 1, wherein the multiplexing section spreads the first quadrature component and the third quadrature component in a frequency domain or a time domain that is set individually for a quadrature component of the combined signal, and spreads the second in-phase component and the fourth in-phase component in the frequency domain or the time domain that is set individually for an in-phase component of the combined signal.

3. The radio communication apparatus according to claim 1, further comprising a determining section that determines a spreading domain for a quadrature component of the combined signal and a spreading domain for an in-phase component of the combined signal according to received quality of the first data and the second data estimated in accordance with data amounts of the first data and the second data,
    wherein the multiplexing section spreads the first quadrature component and the third quadrature component in the spreading domain for the quadrature component of the combined signal and spreads the second in-phase component and the fourth in-phase component in the spreading domain for the in-phase component of the combined signal.

4. The radio communication apparatus according to claim 1, further comprising a determining section that determines a spreading domain for a quadrature component of the combined signal and a spreading domain for an in-phase component of the combined signal according to received quality of the first data and the second data estimated in accordance with modulation schemes of the first data and the second data, wherein the multiplexing section spreads the first quadrature component and the third quadrature component in the spreading domain for the quadrature component of the combined signal and spreads the second in-phase component and the fourth in-phase component in the spreading domain for the in-phase component of the combined signal.

5. The radio communication apparatus according to claim 1, further comprising a determining section that determines a spreading domain for a quadrature component of the combined signal and a spreading domain for an in-phase component of the combined signal according to received quality of the first data and the second data estimated in accordance with coding rates of the first data and the second data, wherein the multiplexing section spreads the first quadrature component and the third quadrature component in the spreading domain for a quadrature component of the combined signal and spreads the second in-phase component and the fourth in-phase component in the spreading domain for an in-phase component of the combined signal.

6. The radio communication apparatus according to claim 1, further comprising a determining section that determines a spreading domain for a quadrature component of the combined signal and a spreading domain for an in-phase component of the combined signal according to received quality of the first data and the second data estimated in accordance with spreading factors of the first data and the second data, wherein the multiplexing section spreads the first quadrature component and the third quadrature component in the spreading domain for the quadrature component of the combined signal and spreads the second in-phase component and the fourth in-phase component in the spreading domain for the in-phase component of the combined signal.

7. The radio communication apparatus according to claim 1, further comprising a determining section that determines a spreading domain for a quadrature component of the combined signal and a spreading domain for an in-phase component of the combined signal according to received quality of the first data and the second data estimated in accordance with delay spreads at destinations of the first data and the second data, wherein the multiplexing section spreads the first quadrature component and the third quadrature component in the spreading domain for the quadrature component of the combined signal and spreads the second in-phase component and the fourth in-phase component in the spreading domain for the in-phase component of the combined signal.

8. The radio communication apparatus according to claim 1, further comprising a determining section that determines a spreading domain for a quadrature component of the combined signal and a spreading domain for an in-phase component of the combined signal according to received quality of the first data and the second data estimated in accordance with Doppler frequencies at destinations of the first data and the second data, wherein the multiplexing section spreads the first quadrature component and the third quadrature component in the spreading domain for the quadrature component of the combined signal and spreads the second in-phase component and the fourth in-phase component in the spreading domain for the in-phase component of the combined signal.

9. The radio communication apparatus according to claim 1, further comprising a determining section that determines a number of multiplexed codes for a quadrature component of the combined signal and a number of multiplexed codes for an in-phase component of the combined signal according to received quality of the first data and the second data estimated in accordance with data amounts of the first data and the second data, wherein the multiplexing section performs multi-code multiplexing of the first quadrature component and the third quadrature component and performs multi-code multiplexing of the second in-phase component and the fourth in-phase component in accordance with the determined numbers of multiplexed codes.

10. The radio communication apparatus according to claim 1, further comprising a determining section that determines a number of multiplexed codes for a quadrature component of the combined signal and a number of multiplexed codes for an in-phase component of the combined signal according to received quality of the first data and the second data estimated in accordance with modulation schemes of the first data and the second data wherein the multiplexing section performs multi-code multiplexing of the first quadrature component and the third quadrature component and performs multi-code multiplexing of the second in-phase component and the fourth in-phase component in accordance with the determined numbers of multiplexed codes.

11. The radio communication apparatus according to claim 1, further comprising a determining section that determines a number of multiplexed codes for a quadrature component of the combined signal and a number of multiplexed codes for an in-phase component of the combined signal according to received quality of the first data and the second data estimated in accordance with coding rates of the first data and the second data, wherein the multiplexing section performs multi-code multiplexing of the first quadrature component and the third quadrature component and performs multi-code multiplexing of the second in-phase component and the fourth in-phase component in accordance with the determined numbers of multiplexed codes.

12. The radio communication apparatus according to claim 1, further comprising a determining section that determines a number of multiplexed codes for a quadrature component of the combined signal and a number of multiplexed codes for an in-phase component of the combined signal according to received quality of the first data and the second data estimated in accordance with spreading factors of the first data and the second data, wherein the multiplexing section performs multi-code multiplexing of the first quadrature component and the third quadrature component and performs multi-code multiplexing of the second in-phase component and the fourth in-phase component in accordance with the determined numbers of multiplexed codes.

13. The radio communication apparatus according to claim 1, further comprising a determining section that determines a number of multiplexed codes for a quadrature component of the combined signal and a number of multiplexed codes for an in-phase component of the combined signal according to received quality of the first data and the second data estimated in accordance with delay spreads at destinations of the first data and the second data, wherein the multiplexing section performs multi-code multiplexing of the first quadrature component and the third quadrature component and performs multi-code multiplexing of the second in-phase component and fourth in-phase component in accordance with the determined numbers of multiplexed codes.

14. The radio communication apparatus according to claim 1, further comprising a determining section that determines a number of multiplexed codes for a quadrature component of the combined signal and a number of multiplexed codes for an in-phase component of the combined signal according to received quality of the first data and the second data estimated in accordance with Doppler frequencies at destinations of the first data and the second data, wherein the multiplexing section performs multi-code multiplexing of the first quadrature component and the third quadrature component and performs multi-code multiplexing of the second in-phase component and fourth in-phase component in accordance with the determined numbers of multiplexed codes.

15. A data multiplexing method multiplexing first data and second data, the data multiplexing method comprising the steps of:

dividing a modulated symbol of the first data into a first in-phase component and a first quadrature component and dividing a modulated symbol of the second data into a second in-phase component and a second quadrature component;

converting the first in-phase component into a third quadrature component and converting the second quadrature component into a fourth in-phase component;

performing multi-code multiplexing of the first quadrature component and the third quadrature component to obtain a first multiplexed signal, and performing multi-code multiplexing of the second in-phase component and the fourth in-phase component to obtain a second multiplexed signal; and combining the first multiplexed signal and the second multiplexed signal to obtain a combined signal.

* * * * *

UNITED STATES PATENT AND TRADEMARK OFFICE
CERTIFICATE OF CORRECTION

| | | |
|---|---|---|
| PATENT NO. | : 7,817,744 B2 | |
| APPLICATION NO. | : 11/720732 | |
| DATED | : October 19, 2010 | |
| INVENTOR(S) | : Masaru Fukuoka et al. | |

It is certified that error appears in the above-identified patent and that said Letters Patent is hereby corrected as shown below:

Claim 10, column 16, line 25, incorrectly reads:
"the second data"
and should read:
"the second data,"

Signed and Sealed this
Twenty-sixth Day of April, 2011

David J. Kappos
*Director of the United States Patent and Trademark Office*